United States Patent [19]
Gerlach

[11] 3,799,071
[45] Mar. 26, 1974

[54] VEHICLE TABLE
[76] Inventor: Doris M. Gerlach, 2501 Osborn Rd., Topeka, Kans. 66614
[22] Filed: Sept. 20, 1972
[21] Appl. No.: 290,731

[52] U.S. Cl............. 108/46, 108/149, 224/42.46 R
[51] Int. Cl............................................ A47b 37/00
[58] Field of Search...224/42.42 R, 42.46 R, 42.46 B; 108/46, 149

[56] References Cited
UNITED STATES PATENTS
| | | | |
|---|---|---|---|
| 2,768,043 | 1956 | Kristoff et al.......................... | 108/46 |
| 3,275,206 | 1966 | Croft............................ | 224/42.03 B |
| 2,533,147 | 1950 | Sparks............................ | 108/46 UX |

FOREIGN PATENTS OR APPLICATIONS
| | | | |
|---|---|---|---|
| 50,920 | 1941 | France................................. | 108/46 |

*Primary Examiner*—Gerald M. Forlenza
*Assistant Examiner*—Jerold M. Forsberg
*Attorney, Agent, or Firm*—Norman G. Steanson, Jr.

[57] ABSTRACT

A center table, centrally hinged and having an upstanding flanged rim on the sides is provided. The center table is foldable upon itself for storing. A pair of side tables, having upstanding flanged rims on 3 sides adapted to be slidably fitted in the opposite ends of the coextensive center table is provided to provide a telescoping vehicle table to fit vehicles of varying internal width. Four double hooks are mounted to the outside end corners of the side tables. Four hooks and chains are provided, with the chains connected on the double hooks by hooking a selected link of the chains on the double hooks and with the hooks of the hooks and chains hooked in the sills of the opposite vehicle windows so that the vehicle table is adjustably and reversably suspended in space at the desired position in space in the vehicle. Four pairs of guides are mounted to the sides of the center table and a pair of locking slides are slid in the guides to prevent the center table from folding when suspended in the vehicle in the flat, hinge side up position.

1 Claim, 4 Drawing Figures 3,799,071

VEHICLE TABLE

BACKGROUND OF THE INVENTION

This invention relates to an adjustable, foldable, telescoping and reversible vehicle table for the interior of a vehicle.

In the prior art, vehicle tables for the interior of a vehicle have been provided that are foldable and telescoping and vehicle tables have been provided that are swingably suspended from the sills of the vehicle windows. However, no prior art has been seen wherein the vehicle table is adjustably and swingably suspended in space from the vehicle sills in the simple and easy manner contemplated by this application and no prior art has been seen wherein the vehicle table has been reversible from a rimmed side wherein service items such as food may be securely placed thereon and a flat side useful as, for example, card playing. And no prior art has been seen wherein one vehicle table has the combination of all of the advantages of being adjustable in space so as to be capable of being kept horizontal no matter what the position of the vehicle, foldable for easier storing, telescoping to fit vehicles of varying internal width, reversible from a rimmed side to a flat side and swingable for greater safety.

A problem solved by this invention is that a vehicle table is provided that enables adults or children to eat, play cards or any other of the many uses of a table in the back seat of a vehicle.

A problem solved by this invention is that a vehicle table is provided to keep children busy during long stays in a vehicle such as on a trip or at a drive-in movie.

A problem solved by this invention is that a vehicle table is provided that is adjustable to any position in space in an easy, simple and economical manner so that the vehicle table may be kept horizontal no matter what the position in space of the vehicle.

A problem solved by this invention is that a vehicle table is provided that is foldable for easier storing. A problem solved by this invention is that a vehicle table is provided that is telescoping to fit vehicles of varying internal width.

A problem solved by this invention is that a vehicle table is provided that is reversible from a rimmed side for securely keeping items, such as food, thereon and a flat side useful for, for example, playing cards or other games.

A problem solved by this invention is that a vehicle table is provided that is swingable to give upon impact in case of accident for greater safety.

A problem solved by this invention is that a vehicle table is provided that combines in one vehicle table all the advantages of being adjustable, foldable, telescoping, reversible and swingable.

SUMMARY OF THE INVENTION

A center table, centrally hinged and having an upstanding flanged rim on the sides is provided. The center table is foldable upon itself for storing. A pair of side tables, having upstanding flanged rims on 3 sides adapted to be slidably fitted in the opposite ends of the coextensive center table is provided to provide a telescoping vehicle table to fit vehicles of varying internal width. Four double hooks are mounted on the outside end corners of the side tables. Four hooks and chains are provided, with the chains connected on the double hooks by hooking a selected link of the chains on the double hooks and with the hooks of the hooks and chains hooked in the sills of the opposite vehicle windows so that the vehicle table is adjustable and reversably suspended in space at the desired position in space in the vehicle. Four pairs of guides are mounted to the sides of the center table and a pair of locking slides are slid in the guides to prevent the center table from folding when suspended in the vehicle in the flat, hinge side up position.

DESCRIPTION OF THE PREFERRED EMBODIMENT

Figure 1:
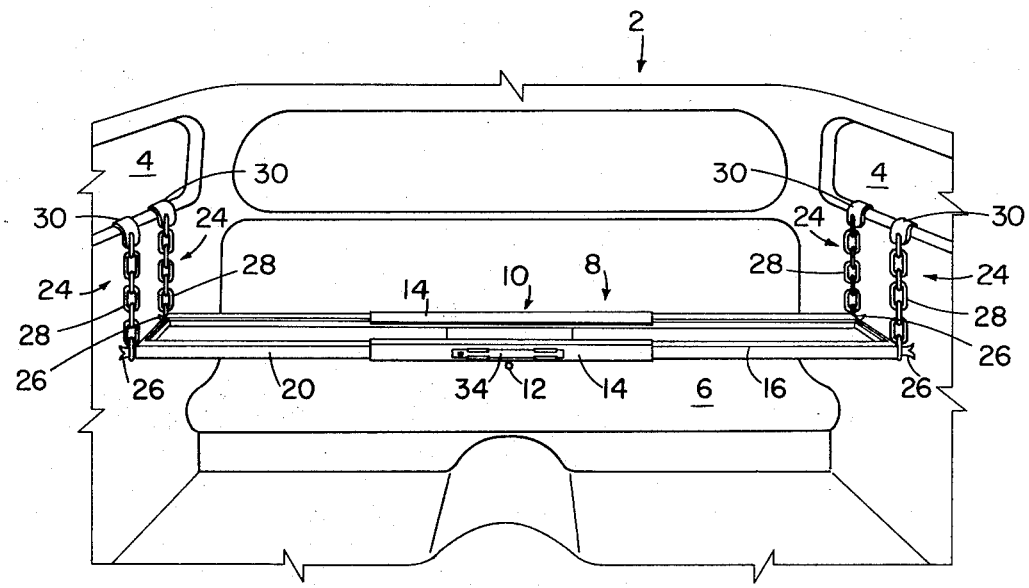
FIG. 1 is a front view of the vehicle table installed in the back seat of a vehicle.
Figure 2:
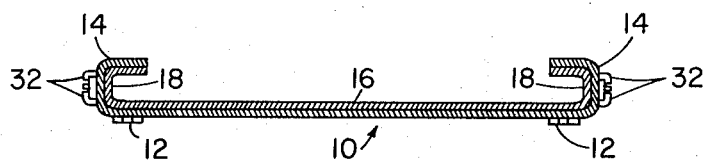
FIG. 2 is a sectional view taken along line 2—2 of FIG. 4.
Figure 3:
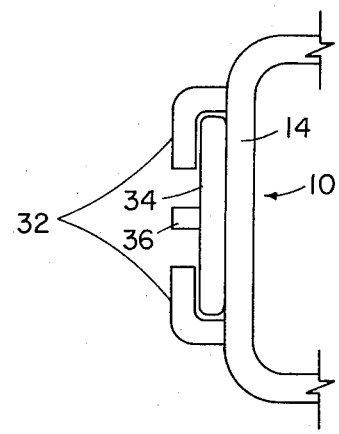
FIG. 3 is an enlarged partial side elevation view of the center table showing the guides and locking slide.
Figure 4:
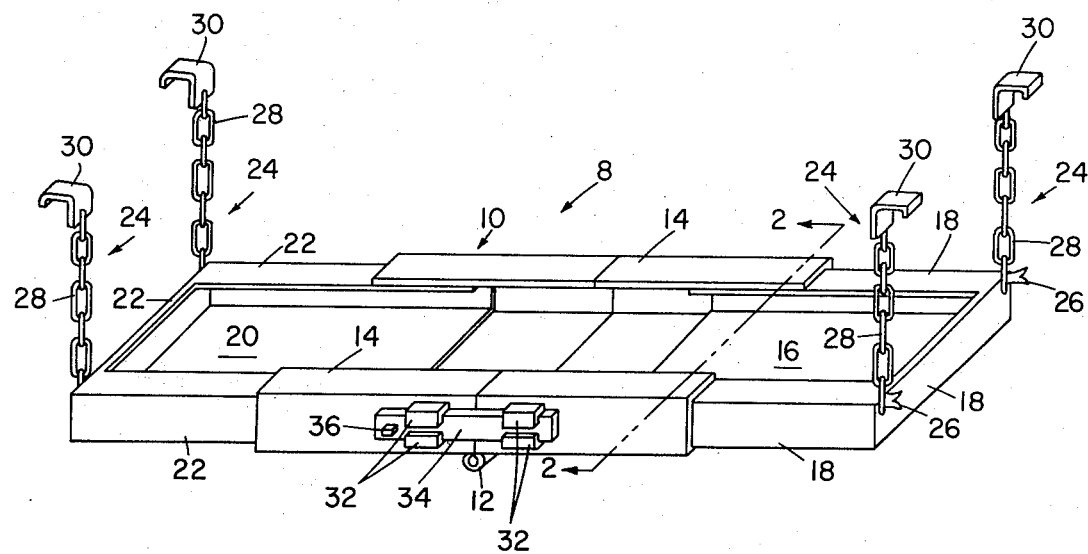
FIG. 4 is a perspective view of the vehicle table.

Referring in more detail to the drawings a vehicle rear interior 2 having the usual side windows 4 and back seat 6 is shown. A vehicle table 8 is shown suspended from the sills of the windows 4. The vehicle table 8 has a center table 10 that is divided and centrally hinged with hinges 12 so as to be foldable for easier storing. The center table 10 has an upstanding, flanged rim 14 on two sides. A pair of side tables comprised of a first side table 16 having an upstanding, flanged rim 18 on three sides and a similar second side table 20 having an upstanding, flanged rim 22 on three sides is provided. The first side table 16 and second side table 20 are coextensive with the center table 10 and adapted to be slidably fitted in the opposite open ends of the center table 10 so as to provide a telescoping vehicle table 8 that will fit vehicles of varying internal width.

To suspend the vehicle table 8 in the vehicle four hooks and chains 24 are provided. Four double hooks 26 are mounted to the outside end corners of the first side table 16 and second side table 20. The vehicle table 8 is suspended in the vehicle by hooking a selected link of the chains 28 of the hooks and chains 24 on the double hooks 26 and hooking the hooks 30 of the hooks and chains 24 in the sills of the windows 4. It can now be seen that the vehicle table 8 can be suspended in the vehicle at any selected position in space in the vehicle by selecting the desired link of the chains 28 to be hooked on the double hooks 26. Thus, the vehicle table 8 may be kept horizontal in space no matter what the position in space of the vehicle, as for example being parked on a hill.

It can also be seen that the vehicle table 8 can be reversed to present the vehicle table 8 flat, bottom, side up since the links of the chains 28 can be hooked on the double hooks 26 just as easily when the vehicle table 8 is in the flat, bottom side up position as when the vehicle table 8 is in the rimmed side up position. To prevent the table from folding up when in the bottom flat side up position, four pairs of guides 32 are mounted, 2 pairs each on the two sides of the center table 10, with the two pairs on opposite sides of the center table 10 hinges 12. Two locking slides 34 with handles 36 are slid into the guides 32 on both sides of the center table 10 to prevent the center table 10 from folding when in the bottom, flat side up position. Thus a reversible table is provided.

Thus a vehicle table 8 is provided that is adjustable to swingably suspend the vehicle table 8 at any desired position in space, that is telescoping to fit vehicles of varying internal width, that is foldable for easier storing, that is reversible from a rimmed side up to prevent spillage to a flat side up to accomplish these and the other enumerated objects of the invention.

The invention in its broader aspects is not limited to the specific manufacture shown and described but departure may be made therefrom within the scope of the accompanying claims without departing from the spirit of the invention and without sacrificing its chief advantages.

I claim:

1. A foldable, adjustable, telescoping and reversible vehicle table for the inside of a vehicle which comprises:

a. a centrally hinged center table foldable on itself and having an upstanding, flanged rim on the center table sides:

b. a means for preventing the vehicle table from folding upon itself when in the hinge side up position mounted to the center table sides:

c. a pair of side tables having upstanding, flanged rims on three sides and adapted to be slidably fitted in the opposite ends of the center table to provide a telescoping table for fitting vehicles of varying internal width;

d. a plurality of means for connecting mounted to the rims of the pair of side tables;

e. a plurality of hooks and chains, the chains connected to the connecting means by hooking a selected link of the chain on the connecting means and with the hooks hooked in the sills of the opposite vehicle windows so that the vehicle table is adjustably and reversibly suspended in space at the desired position in the vehicle, and whereby the reversibility and suspension of the vehicle table is accomplished by the same means and whereby the table is reversible from a flat side up to a rimmed side up whereby objects are prevented from sliding off the table in the latter position.

* * * * *